Patented July 27, 1926.

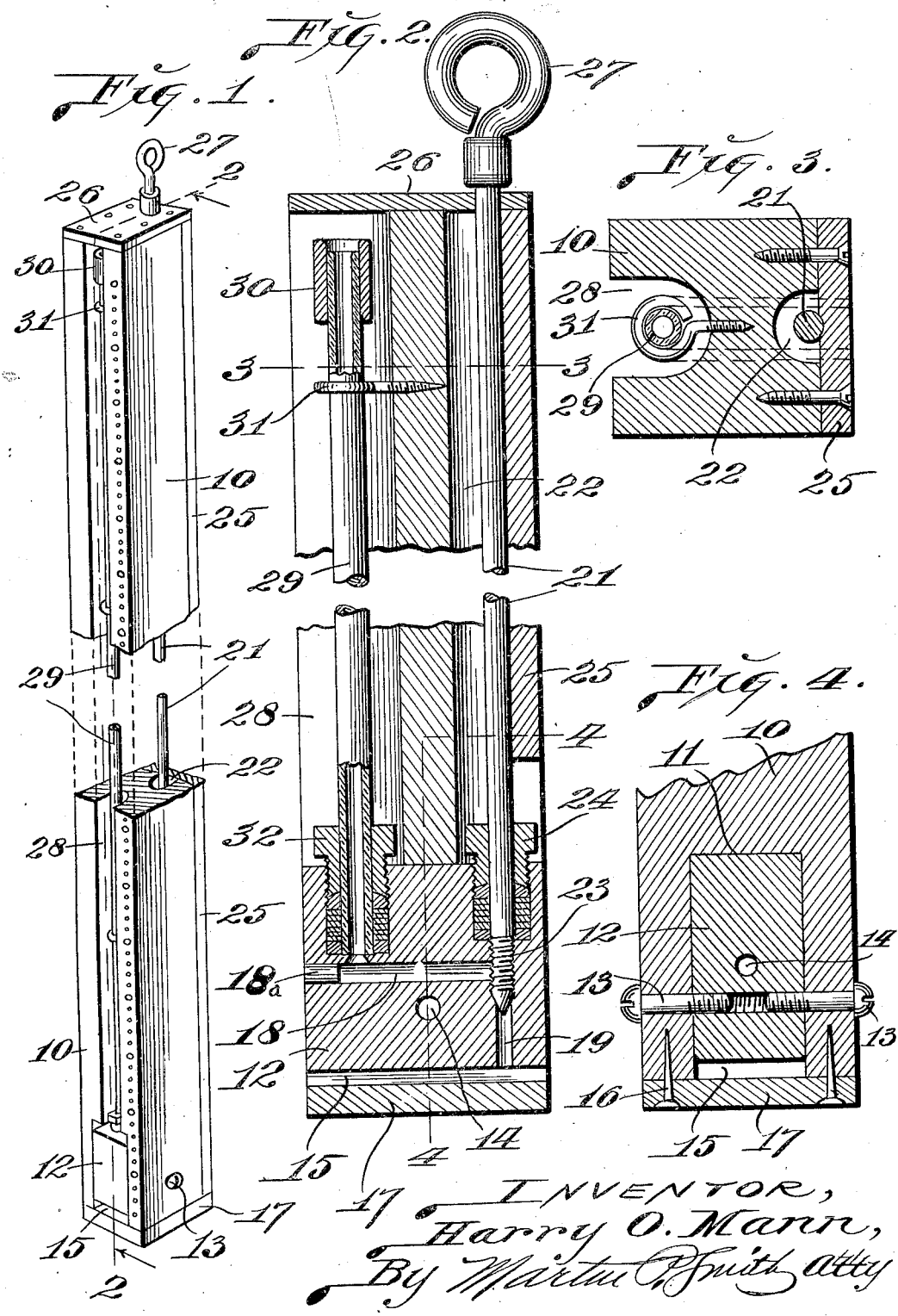

1,594,210

UNITED STATES PATENT OFFICE.

HARRY O. MANN, OF LOS ANGELES, CALIFORNIA.

ULLAGE ROD.

Application filed July 23, 1924. Serial No. 727,673.

My invention relates to an ullage rod, the principal object of my invention, being to provide a relatively simple device that may be readily and conveniently manipulated and which will be effective in giving an accurate reading of the liquid contents of tanks and like containers.

Further objects of my invention are to provide an ullage rod that gives an accurate reading of the liquid contents of a tank or like container through the medium of a transparent tube within which a column of liquid is trapped when the device is inserted in the tank or container and, further, to provide a device of the character referred to that is strong and substantial in structure and which may be easily and cheaply produced.

The particular form of ullage rod herein shown and described is especially adapted for measuring the liquid contents of gasoline tanks at automobile service stations, which tanks, to meet local requirements, are located a certain distance below the surface of the ground.

With the foregoing and other objects in view, my invention consists in the features of construction and combination and arrangement of parts hereinafter more fully described and claimed, reference being had to the accompany drawings, in which—

Figure 1 is a perspective view of an ullage rod or measuring device of my improved construction;

Figure 2 is an enlarged vertical section taken approximately on the line 2—2 of Figure 1;

Figure 3 is a horizontal section taken on the line 3—3 of Figure 2;

Figure 4 is a vertical section taken on the line 4—4 of Figure 2.

Referring by numerals to the accompanying drawings, 10 designates a rod of wood or like material that forms the body of the ullage rod and the length of said rod is such that when its lower end is placed on the bottom of a tank or container the upper portion thereof will project a substantial distance above said tank or above the surface of the ground in which the tank is embedded.

Formed in the lower end of the rod 10 is a substantially rectangular notch or recess 11 in which is arranged a block 12, preferably of metal, the latter being secured in position within said recess in any suitable manner, but preferably by screws such as 13, which pass through the lower portion of said rod to the sides of the block and enter a threaded aperture 14 that passes through said block. The under surface of block 12 occupies a plane a slight distance above the lower end of rod 10, thereby providing a shallow chamber 15 immediately beneath said block 12.

Arranged on the under side of rod 10 and secured thereto in any suitable manner, preferably by means of nails or screws 16, is a section 17 of leather or analogous material that performs the functions of a cushion or shock absorber when the device is lowered into a tank or container and the lower end of said device makes contact with the bottom of said tank.

Formed through the central portion of block 12 is a horizontally disposed duct 18, the front end of which is closed by a plug 18ª and the rear end of said duct communicates with the upper end of a short vertically disposed duct 19 that is formed in the rear portion of block 12. The lower end of duct 19 communicates directly with the shallow chamber 15 between block 12 and cushion 17. The upper portion of the duct 19 is provided with a seat 20 for the tapered lower end of a valve rod 21, which latter extends upwardly through a longitudinally disposed channel 22 that is formed in the rear portion of rod 10. A portion of this rod 21 immediately above its lower end is threaded, as designated by 23, and said threaded portion operates in a correspondingly threaded bore in block 12 immediately above the duct 19.

A suitable gland or stuffing box 24 for the valve rod 21 is arranged in the top of block 12, thereby providing a fluid tight joint between said rod and block. A plate 25, preferably of metal, is secured to the rear side of rod 10 and overlies the chamber 22 and rod 21 within said chamber bears against the inner face of this plate throughout its length, thus effectually preventing bending or buckling of the rod when the same is rotated to close communication between the passageways 18 and 19. The upper portion of valve rod 21 passes through a metal plate 26 that is secured on top of rod 10 and the upper end of said rod 21 is bent to form a ring or loop 27 that serves as a handle for engaging and rotating said valve rod.

Formed in the front portion of rod 10 is a longitudinally extending groove or channel 28 and located therein is a tubular member 29 of glass, celluloid or other transparent material. The upper end of this transparent tube terminates adjacent to plate 26 and said upper end, which is open to atmosphere, is enclosed by a ring or collar 30 of rubber or analogous material. Tube 29 is held in position within the groove or channel 28 in any suitable manner, preferably by means of rings or screw eyes 31 that encircle said tube and which are anchored in rod 10. The lower portion of transparent tube 29 passes through a suitable gland or stuffing box 32 that is arranged in the upper portion of block 12, and the open lower end of said tube has direct communication with the forward portion of passageway 18.

One or more of the outer faces of rod 10 may be calibrated or provided with a graduated liquid measurement scale, which latter, it will be understood, must be arranged and graduated in accordance with the tank or container in which the ullage rod is to be used. For instance, for relatively small tanks the graduations on the liquid measurement scale may be arranged so as to indicate gallons and for larger tanks and containers or those of several hundred or several thousand gallons capacity the graduations may be arranged so as to register five or ten gallons between the marks.

In the use of my improved ullage rod, the rod is lowered into a liquid container or tank until the cushion 17 rests on the bottom thereof, and valve rod 21 may be manipulated either before or after the rod is lowered into the tank so as to lift the lower end of said rod from its seat and thereby establish communication between passageways 18 and 19. The liquid within the tank or container will flow freely through the passageways 19 and 18, and thence rise in transparent tube 29 to the same level as the volume of liquid within the tank or container. Valve rod 21 is now rotated so as to cause the same to move downward and close the liquid passageway through block 12 and the implement is now lifted from the tank or container and an inspection of the height of the column of liquid within tube 29 and a reading of the adjacent mark on the graduated scale gives the total amount in gallons or the volume of liquid within the tank or container.

In some instances, the screw eyes 31 may be dispensed with and the transparent tube 29 retained firmly in position by means of U-shaped loops or keepers that engage said tube and extend rearwardly through the body of rod 10 and plate 25 (see dotted lines, Figure 3).

An ullage rod of my improved construction is comparatively simple, may be easily and cheaply produced and may be conveniently used for obtaining an accurate reading of the total amount of liquid contained in a tank or the like.

It will be readily understood that various minor changes in the size, form and construction of my improved ullage rod may be made without departing from the spirit of my invention, the scope of which is set forth in the appended claims.

I claim as my invention:—

1. In an ullage rod, an elongated body provided with a pair of longitudinally disposed channels, an open-ended transparent tube arranged within one of said channels and extending the entire length of said elongated body, the lower end of said tube communicating with a liquid inlet at the lower end of said elongated body, a valve rod occupying the other channel in said elongated body and adapted to close the liquid inlet at the lower end of said body, said tube and valve rod being located wholly within said elongated body and a cushion applied to the under face of the lower end of said elongated body.

2. In an ullage rod, an elongated body provided with a pair of longitudinally disposed channels, an open-ended transparent tube arranged within one of said channels and extending the entire length of said elongated body, the lower end of said tube communicating with a liquid inlet at the lower end of said elongated body, a valve rod occupying the other channel in said elongated body and adapted to close the liquid inlet at the lower end of said body, said tube and valve rod being located wholly within said elongated body, a cushion arranged on the under face of the lower end of said elongated body and a graduated scale formed on the outer face of said elongated body adjacent to said open-ended transparent tube.

In testimony whereof I affix my signature.

HARRY O. MANN.